March 20, 1956 G. FLEISCHEL 2,738,683
CONTROL MECHANISM FOR AUTOMOTIVE TRANSMISSIONS
Filed Oct. 31, 1949 2 Sheets-Sheet 1

INVENTOR
Gaston Fleischel

BY Moore & Hall

ATTORNEYS

March 20, 1956   G. FLEISCHEL   2,738,683
CONTROL MECHANISM FOR AUTOMOTIVE TRANSMISSIONS
Filed Oct. 31, 1949   2 Sheets-Sheet 2
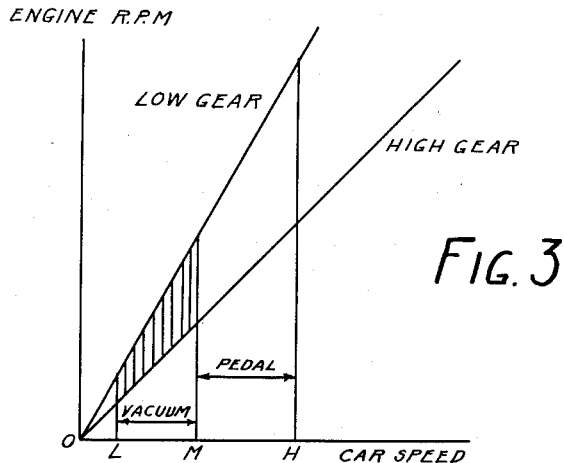
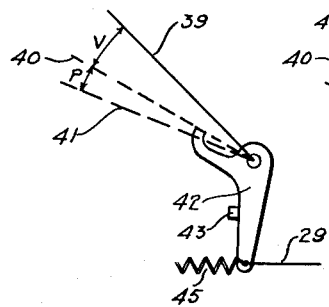 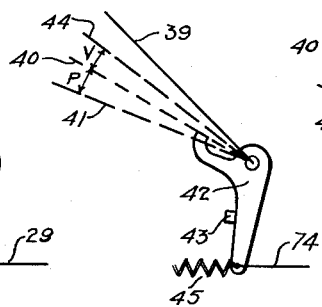 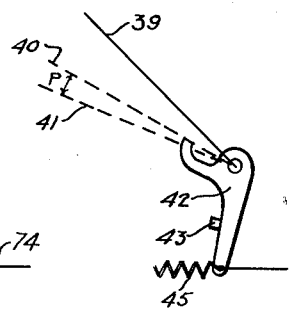
INVENTOR
Gaston Fleischel
BY Mark & Hall
ATTORNEYS United States Patent Office 2,738,683
Patented Mar. 20, 1956

2,738,683

CONTROL MECHANISM FOR AUTOMOTIVE TRANSMISSIONS

Gaston Fleischel, New York, N. Y.; dedicated, by mesne assignments, to the free use and benefit of the Public Application October 31, 1949, Serial No. 124,603

The entire term of the patent granted has been dedicated to the Public

1 Claim. (Cl. 74—336.5)

The present invention concerns automatic controls for automotive transmissions.

It is an object of the invention to provide a governing control for automatic transmissions having a speed responsive governor device actuating a dual position distributor against the action of a spring.

It is an object of the invention to provide a manifold vacuum controlled means such as a pressure sensitive diaphragr for modifying the action of a spring on a dual position distributor.

It is an object of the invention to provide means controlled by the throttle or throttle actuating means for opposing the action of a governor on a dual position distributor.

It is an object of the invention to provide a governing control for shifting an automatic transmission comprising an abrupt action governor connected to one of the rotating shafts of a transmission and acting against the force of a spring to operate a dual position distributor, pressure diaphragm means connected to the vacuum manifold of the engine to modify the action of said spring with an operator controlled cutout therefor and additional means operated by the throttle means in a position adjacent its full open position for opposing the action of the governor.

The structure and operation of my abrupt action governor is shown and described and detail in my copending application filed May 20, 1950, Serial No. 163,240 for "Snap-Action Governor."

In the control of internal combustion engines according to the present invention selective use is made of (a) the angular velocity or speed of one of the rotating shafts and the vacuum within the engine intake manifold and (b) the angular velocity of a shaft and throttle or accelerator motion or position. While the control is automatic in the complete sense as will be seen below, the driver operates the two factors (a) and (b) at will, separately or in sequence.

For additional background material reference is made to the United States patents granted to me in the automotive control field and among others No. 1,893,644, granted January 10, 1933, and No. 1,993,544, granted March 5, 1935.

The drawings are intended to present certain forms the invention may take and are to be construed as illustrative and not as limiting. In the drawings like numerals refer to like parts throughout.

Fig. 3 is a diagram showing one possible relation of the vacuum controlled and pedal or accelerator controlled gear change events with respect to engine speed as an ordinate and car speed as an abscissa.

Fig. 4(a), 4(b) and 4(c) show the relation of gear change events and accelerator pedal actuation.

Figure 1:
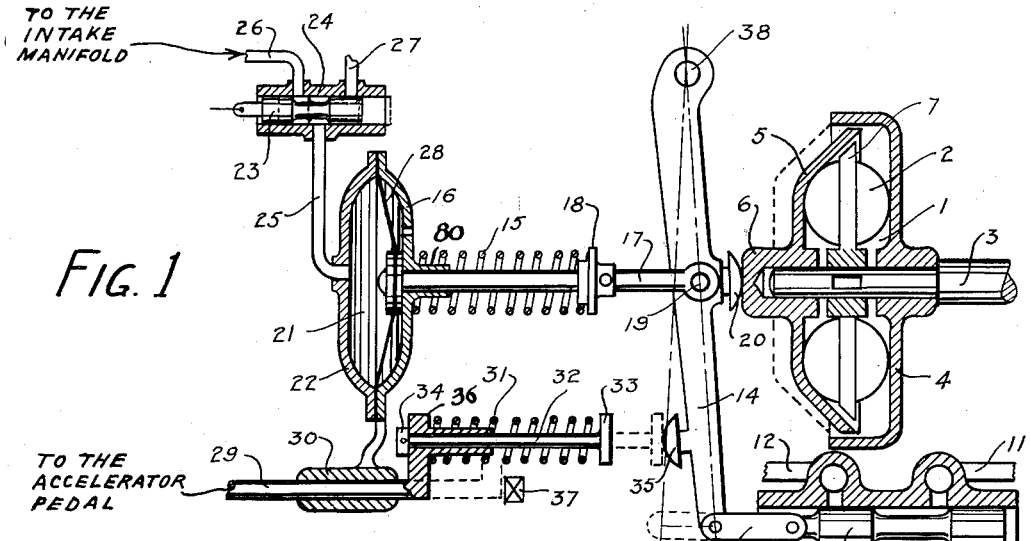
Fig. 1 is a schematic showing in section showing one form the invention may take.

A control device for automatic transmissions comprises a governor connected to one of the rotating shafts, a limiting force acting against the governor and a moving part under the joint control of the governor and the limiting force designed to actuate the servo mechanism which performs the transmission shifts from one drive relation to another. The shifts in drive relation may be effected by a shift in gear or planetary gear transmissions, by changing the characteristics of gearless devices such as torque converters or the like whether used separately or in groups or by a combination of both the above. Such devices as carbonyl iron magnetic clutches may also be utilized. It will of course be understood that the structure effecting the above operation is to be designed and constructed in accordance with the way the particular transmission is operated whether mechanically, hydraulically, electrically, etc. The governor, for example, should be critical in its effect on the dual position distributor previously mentioned so that it will move promptly from one position to the other and experience what may be called snap action. This snap action may be provided by the governor itself or suitable linkage design which may be critical in its operation with or without bias. Again the resilient force opposing the governor action is of prime importance. The control is applicable to as many drive ratios as may be desired and is not limited to a two ratio hydraulically controlled transmission as shown in Fig. 1.

A governor 1 may take the form of a ball governor with masses 2 confined within a housing 4 and 5 mounted on a shaft 3. Shaft 3 is selected as having the desired speed characteristics. The governor housing comprises a pressure plate 4 resting on a suitable collar or shoulder of shaft 3 and anchored against axial movement with respect thereto. The ball masses 2 are freely mounted in suitable holes in a flat-guide disc 7 which is keyed to shaft 3. The governor housing is completed by a pressure cone 5 having a hub 6 mounted to slide axially on a stub end of shaft 3 under the action of ball masses 2. Guide plate 7 permits balls 2 to move radially outward under the action of "centrifugal force" and subject to the centripetal force applied to ball masses 2 by the wall of pressure cone 5. The governor 1 is shown in its closed position with pressure plate 4 and pressure cone 5 nearest each other.

The pressure cone 5 transforms the radial force of ball masses 2 into an axial force along shaft 3. Hub 6 makes point or small area contact with rounded abutment 20 mounted at 19, more or less centrally on lever 14, which is pivoted to the chassis or a related member at 38. In open position pressure cone 5 assumes the dotted position shown and lever 14 assumes the position indicated by the left center line which passes through pivot 38.

The member controlling the transmission, torque converter or the like is preferably an hydraulic valve element 8 slidably mounted in a housing 9. The position shown in Fig. 1, corresponding to the closed position of governor 1, provides for the distribution or direction of oil under pressure from pipe 10 into pipe 11. In the present embodiment of the invention this action is chosen to place the low drive ratio into operation. Valve element 8 is connected to the lower free end of lever 14 by link 13. When lever 14 pivots to the left as governor 1 opens, link 13 pulls sliding valve element 8 to the left, shutting off pipe 11 and directing the oil or other fluid from pipe 10 into pipe 12. This action places the high drive ratio in operation.

A link 17 is pivoted to lever 14 at 19, just opposite abutment 20. A closed chamber 21 is formed by shell halves 16 and 22 with a flexible, pressure responsive diaphragm 28 mounted therebetween. Link 17 extends through shell 16 and is fastened to the center of diaphragm 28. Shell 16 is provided with an outstanding central tubular portion 80 which slidably receives and serves as a bearing for one end of link 17. Tubular portion 80 also serves as a seat and anchor for compression spring 15 which surrounds the left hand portion of link 17, bearing against shell 16 and collar 18 on link 17.

Variable volume chamber 21 is formed by shell half 22 and flexible diaphragm 28. Shell half 16 is vented to the atmosphere so that the right hand side of diaphragm 28 is subject only to atmospheric pressure. Chamber 21 is maintained at the reduced pressure of the engine intake manifold by pipe 25 which leads through the center of shell half 22.

A manually operable valve element 23 is slidably mounted within a valve body 24 to which pipe 25 is connected. Pipe 26 leading from the engine intake manifold and pipe 27 leading to the atmosphere are also connected to valve body 24. Valve element 23 has a center portion of reduced section and when in the position shown in Fig. 1 connects chamber 21 with pipe 26 and the intake manifold so that a partial vacuum is established in chamber 21 of the same number of inches of mercury as exists in the engine intake manifold. When valve element 23 is manually moved to the right as shown in dotted lines chamber 21 is connected to the atmosphere through pipe 27. Under these conditions diaphragm 28 has atmospheric pressure on both sides and may be regarded as exerting no force on link 17.

Collar 18 is preferably positioned so that spring 15 is under some initial compression. It follows that spring 15 always exerts a force on link 17 and lever 14. When valve element 23 is in the left position and chamber 21 is subject to the reduced pressure or vacuum of the intake manifold, the resultant force on diaphragm 28 opposes the action of spring 15 and reduces its effect, but the size of the diaphragm 28, the inches of vacuum in the intake manifold and chamber 21 are so related to the constant of spring 15 that diaphragm 28 cannot overcome the effective action of spring 15 on link 17 and lever 14, but only reduce it.

Spring 15 is not the sole force capable of acting in opposition to the axial movement of governor 1. A link rod 29 is connected to a bell crank 42 which can be actuated by the accelerator pedal 39 under certain conditions. Link 29 is slidably mounted in slide bearing member 30 attached to the chassis or the like and is provided with a shoulder element 36 which has a bearing channel therethrough in which is mounted a pin member 32. A compression spring 31 surrounds pin member 32 and bears against right hand head 33 and shoulder element 36. The left end of pin member 32 has an adjustable collar 34 which bears against the opposite side of shoulder 36 and is so positioned on member 32 that spring 31 is under some slight initial compression. As link 29 is advanced to the right, shoulder 36 and pin member 32 are carried with it until head 33 contacts abutment 35 on the lower left side of lever 14 just above link 13. When head 33 makes contact with abutment 35 continued movement of link 29 causes pin member 32 to slide in shoulder 36, compressing spring 31. As spring 31 compresses it causes head 33 to act with increasing force on abutment 35 and tends to rotate lever 14 in a counterclockwise direction in opposition to governor 1. Link 29 may be advanced under the action of the accelerator pedal 29 until it reaches stop 37. A tension spring 45 restores link 29 and pin member 32 to inactive position with bell crank 42 resting against stop 43. From Fig. 4(a) and Fig. 1 it will be seen that when the driver depresses the accelerator pedal 39 enough to actuate bell crank 42 and cause head 33 to engage abutment 35, the force of spring 31 is added to that of spring 15 on lever 14.

Fig. 3 is a diagram showing the results obtained with the above arrangement. Engine R. P. M. are plotted against car speed as abscissa. It will be seen that each ratio of the transmission has a characteristic line. Lines for low gear ratio and high gear ratio are shown.

The whole range of transmission shiftings of the car can be determined by preliminary study and checked by tests. Such a range on Fig. 3 extends from L, the lowest shift, to H, the highest shift, and may be usefully cut into two portions by choosing an intermediate point M, hereinafter called the medium shift.

The left portion, LM, includes all ratio changes or shifts at low engine speed which are required for proper functioning of the engine and to avoid engine noise and discomfort in driving. The right portion MH includes all shifts at higher engine velocities which are in general performance or emergency shifts for greater acceleration.

It is a purpose of the invention to place the low speed shifts under vacuum control and the higher speed shifts under accelerator pedal control by means of an overtravel beyond full throttle opening. With the present invention the driver uses the throttle in the usual way and is less apt to be disturbed by an unnecessary high speed shift. However, when an emergency or performance shift is needed it is immediately performed at the driver's election by pressing the accelerator pedal past full throttle to overtravel or by the use of the last degrees of arc of pedal travel to full throttle opening against additional spring tensions as will be explained below.

The desired results are obtained by (a) designing spring 15 with a constant yielding sufficient stiffness to balance the governor thrust developed at car speed M plus the minimum vacuum action on link 17 effective at wide open throttle; (b) selecting an effective area for vacuum diaphragm 28 such that a full vacuum i. e., maximum manifold reduced pressure, creates a pull on link 17 in opposition to spring 15 and decreases the force on pivot 19 to a value equal and opposite to that of the thrust of governor 1 at car speed L and (c) giving to spring 31 a force equal to the difference of the thrusts of governor 1 at car speeds H and M. The automatic control will follow the diagram of Fig. 3 accurately with the advantage that the driver can make performance shifts at will with immediate response.

In Figs. 4(a), 4(b) and 4(c), the letter V indicates the range or arc of travel of accelerator pedal 39 within which the shifts are vacuum controlled and P indicates the range of pedal control. In an alternate arrangement P is partly included in the throttle travel and partly in accelerator overtravel.

Fig. 4(a) shows the relationship of shifts or ratio change with respect to accelerator pedal position when the driver uses the vacuum of the intake manifold by manually setting valve element 23 in its left hand position. Accelerator pedal 39 is shown in solid line position when the engine is idling. Line 40 shows the pedal position when the carburetor is wide open. At line 40 accelerator pedal 39 engages the curved arm of bell crank 42 and rotates it counterclockwise as the pedal moves through the overtravel arc to line 41 which represents the pedal position when shoulder 36 of link 29 engages stop 37. Normally bell crank 42 is held against stop 43 by tension spring 45. It is clear that with the above construction motion of linkage 29 is possible only in the last part of the stroke of pedal 39.

When pedal 39 is fully released and the throttle closed as indicated by the solid line, the shift occurs at the lowest level of car speed L in Fig. 3. This happens for example when the car is being stopped, the drive being placed in the low ratio just shortly before the car stops.

If the pedal 39 is partly depressed in a counterclockwise direction so that it is positioned between lines 39 and 40 in Fig. 4(a), the shifts occur between L and M which determine the limits of car shifting speed. If the pedal 39 is depressed to full open throttle or overtravel at 41, then shifts occur at car speed H for performance driving. If desired the angle P can be included in the last few degrees of arc of throttle opening.

Fig. 4(c) shows the effect of manipulating valve element 23 to the right and connecting chamber 21 to the atmosphere through pipe 27. This equalizes the pressures on diaphragm 28 which yields zero resultant force to oppose spring 15. As a result all shifts occur at the same car speed M regardless of intermediate pedal position. Only when the pedal 39 rotates bell crank 42 and head 33 is forced against abutment 35 on lever 14 is the shift forced to occur at car speed H.

Figure 2:
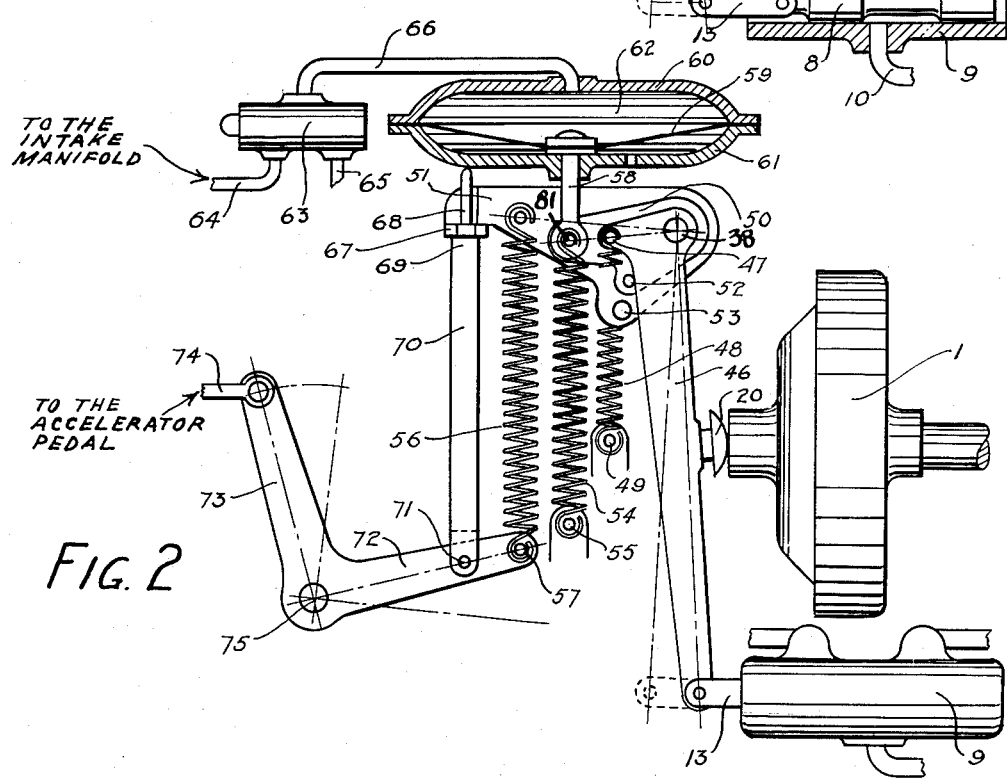
Fig. 2 is a schematic showing in section of another form of control according to the invention.

Fig. 2 presents a modification utilizing three springs rather than two. Governor 1 and control distributor 9 are both connected as in Fig. 1 to a lever 46 pivoted on a pin 38 on the body or frame. Governor 1 acts on an abutment 20 and distributor 9 is connected to link 13, both connected to lever 46. Lever 46 is a bell crank having an offset pin 47 to which is attached one end of tension spring 48 the other end of which is anchored to a fixed pin 49. Spring 48 tends to rotate lever 46 counterclockwise and maintain abutment 20 in contact with the hub of governor 1. Two bell crank levers 50 and 51 are also pivoted on pin 38. Lever 50 is the shorter of the two and has a pin 52 positioned to engage lever 46 and tend to rotate it counterclockwise in opposition to the thrust of governor 1. Bell crank lever 50 is urged counterclockwise by a tension spring 54 anchored to fixed pin 55 and connected to lever 50 at pivot pin 81. Link 58 connects pivot pin 81 and the central part of diaphragm 59 mounted between shell halves 60 and 61. Diaphragm 59 and shell half 60 form a chamber 62 which is connected to manual control valve 63 by pipe 66. Valve 63 may connect pipe 66 and chamber 62 to either pipe 64 leading to the engine intake manifold or to pipe 65 leading to the atmosphere and operates in the same way as valve 23, 24 which it closely resembles. Shell 61 is vented to the atmosphere and when valve 63 connects pipe 66 and pipe 65 diaphragm 59 has atmospheric pressure on both sides and exerts no resultant force. When chamber 62 is connected to pipe 64, however, diaphragm 59 tends to move upward and oppose the action of spring 54 on bell crank 50 and lever 46.

Bell crank lever 51 is provided with a pin 53 positioned to bear against lever 46 upon counterclockwise rotation of lever 51 under the action of spring 56. Lever 51 is provided with a flanged end or offset projection 67 which is drilled to receive a pin 68 extending from the end of an arm 70 pivoted at 71 to an arm of bell crank 72. The spring 56 has one end anchored at 57 on bell crank 72 and the other end attached to bell crank 51 intermediate pivot 38 and projection 67. Arm 70 has a shoulder 69 bearing against the under side of projection 67 and is held in position by pin 68. Shell 61 is positioned to act as a stop for pin 68 and to limit the upward movement of arms 70 and 72. Crank 72 has a second arm 73 and is pivoted to the frame at 75. Arm 73 is joined to the end of bell crank 42 of Fig. 4(b) by link 74. As above explained bell crank 42 and link 74 are actuated by the accelerator pedal 39 on its overtravel only or during the last few degrees of arc of throttle travel. Spring 45 acts to return bell crank 42 to stop 43 and by means of link 74 the bell crank 72, 73, link 70, spring 56 and bell crank 51 are returned to their normal upper position as soon as they are free to move. This action tends to rotate pin 53 clockwise away from lever 46. Spring 56 also aids in this action until the shoulder of link 70 engages projection 67. As a result spring 45 may be made light. As a result the above linkage normally remains in such a position that pin 53 normally remains out of contact with lever 46 as it swings under the action of governor 1 and spring 56 is normally inoperative as long as the overtravel of accelerator pedal 39 is not used or bell crank 42 remains stationary. On the contrary, spring 48 is always acting to oppose the thrust of governor 1.

Spring 54 tends to rotate bell crank 50 counterclockwise and through pin 52 oppose the governor action on lever 46. The action of the intake manifold vacuum when valve 63 connects pipes 64 and 66 causes diaphragm 59 to experience a resultant force because of the unbalance atmospheric pressure in shell half 61 and to exert an upward pull on link 58 and pin 81. This action tends to rotate bell crank 50 clockwise in opposition to spring 54. Because of the presence of spring 48 the resultant force from vacuum action transmitted by link 58 may be increased and have a value about twice the strength of spring 54. It follows that full manifold intake vacuum causes a large enough resultant force at link 58 to completely overcome the effect of spring 54 and this condition prevails as long as the resultant force on link 58 is at more than half its maximum value. As the resultant force due to the vacuum falls below half its maximum, spring 54 becomes effective and causes pin 52 to engage lever 46 with increasing force which opposes the thrust of governor 1 and becomes a maximum when the vacuum is a minimum.

The adjustment to obtain the above result is obtained as follows: Spring 48 is designed to exert constantly a force which will balance the thrust of governor 1 at car speed L. Spring 54 is designed to exert a force which will balance the thrust of governor 1 at car speed M minus the thrust of governor 1 at car speed L plus the minimum vacuum action. Spring 56 is designed to exert a force which will balance the governor thrust at car speed H, minus the governor thrust at speed M, plus minimum vacuum action. Diaphragm 59 has an effective area so related to available pressure differential thereon that link 58 exerts a force about twice the force of spring 54 under maximum vacuum.

When valve 63 connects pipes 66 and 64, placing chamber 62 at intake manifold pressure the apparatus operates as follows. As long as the vacuum is high enough the action of link 58 on pin 81 cancels any force of spring 54. Spring 56 is also inoperative as long as bell crank 42 rests against stop 43 i. e., accelerator pedal overtravel is not used. This is true because spring 56 is at its minimum length and shoulder 69 abuts projection 67. Spring 48 is then acting alone against the thrust of governor 1 and shifts in drive ratio occur at car speed L.

When the intake manifold vacuum falls below half its maximum value, the spring 54 begins its effective action on bell crank 50 and through pin 52 on lever 46. This action of spring 54 increases to its maximum value at full throttle where the vacuum is a minimum. The shifting point moves progressively from car speed L to car speed M. When the driver actuates the pedal 39 in overtravel or so that it rotates bell crank 42, link 74 rotates arm 72 downward, spring 56 exerts a pull on bell crank 51 and causes pin 53 to bear against lever 46. This action displaces shifts to the highest level, car speed H.

Fig. 4(b) shows the operation of the apparatus with relation to the position of accelerator pedal 39. Line 44 represents the position of pedal 39 when the vacuum action on link 58 is such as to just balance the force of spring 54 in Fig. 2. Thus, between positions shown by the solid line representing pedal 39 and line 44 of Fig. 4(b), there is no change in the car shifting speed which remains at point L in Fig. 3.

It will be seen that the driver enjoys a relatively wide range of accelerator positions without any shift resulting from his operation of pedal 39 to control car speed.

Beyond position 44 in Fig. 4(b), the car shifting speed moves up until point M in Fig. 3 is reached at full throttle with the pedal 39 at position 40. When the pedal 39 is depressed beyond position 40 into overtravel, pedal 39 rotates bell crank 42 and shifts are made at car speed H.

Should the driver open valve 63 to the atmosphere shifts always occur at the same car speed M in normal travel of pedal 39 and the shifts occur at car speed H if overtravel is used as explained above with regard to Figs. 1 and 4(c).

From the above it will be seen that the structures of Figs. 1 and 2 in the manner in which they provide dual control by vacuum from the intake manifold representing an operating condition of the engine and by the accelerator pedal representing the performance requirements of the driver to meet immediate driving needs, enable the driver to have better control over the car. The above structures eliminate the undesirable lag in some hydraulic control systems which results in hanging or delayed response when the driver wishes immediate acceleration to pass another car in traffic or the like. A greater versatility is also obtained because several diagrams are available. Intake manifold vacuum can be employed alone by using only the normal travel of the accelerator pedal. Without any training of the driver, vacuum and pedal action can be used together and in sequence. Finally, if performance shifting alone is wanted, the intake manifold vacuum may be cut off when desired, for instance by a knob on the dashboard which operates valve 23 or valve 63. This action leaves the overtravel of the accelerator pedal alone operative to effect a shift.

As indicated above the "abrupt-action" of the governor is an important factor in the elimination of shift lag. As shown in Fig. 1 and explained in detail in my above copending application the abrupt-action or prompt movement from a one position to another is obtained from the geometry of pressure cone 5 and the force exerted by spring 15. Cone 5 has an inner flat truncated portion in a plane normal to the axis of rotation. The slope of the conical portion 5 and the constant of spring 15 are so chosen that the forces exerted by balls 2 on cone 5 increase at a greater rate than the opposing force due to the compression of spring 15. It follows that as soon as balls 2 leave the transition curve at the junction of the flat and conical surfaces of the truncated cone 5 the cone 5 moves at once to the dotted position shown unless some other member such as throttle controlled lever 33 intervenes. This quick movement is termed abrupt-action and the speed at which it occurs depends upon the design of the transition curve and the effect of diaphragm 28. Where no transition curve is used the critical speed is determined by the inertia of the mechanism and diaphragm 28.

While there has been described what is at present believed to be the preferred embodiment of this invention, it will be obvious to those skilled in the art that various changes and modifications may be made therein without departing from the invention and it is, therefore, intended in the appended claims to cover in generic terms all such changes and modifications as fall within the true spirit and scope of the invention.

I claim:

In a control mechanism for an automatic automotive transmission for automotive vehicles driven by an internal combustion engine having an intake manifold, a shaft driven by one part of an automotive vehicle, a speed responsive governor driven by said shaft and having an actuating element which moves abruptly at a selected speed of said shaft, a lever arm pivoted to the vehicle and positioned to be rotated by the governor actuated element, a distributor means operatively connected to said lever at an end opposite its pivot, a link acting upon said lever at the same point as said governor actuating element and in the opposite direction, said link being actuated by a spring and a fluid operated diaphragm responsive to the degree of vacuum in the intake manifold of the engine of the vehicle, a second link movable to and from said lever and means on said lever arm positioned between said first link and said distributor means for receiving the action of said second link.

References Cited in the file of this patent

UNITED STATES PATENTS

| Number | Name | Date |
|---|---|---|
| 1,893,644 | Fleischel | Jan. 10, 1933 |
| 1,958,427 | Hainsworth | May 15, 1934 |
| 1,993,544 | Fleischel | Mar. 5, 1935 |
| 2,019,146 | Livermore | Oct. 29, 1935 |
| 2,022,442 | Stollberg | Nov. 26, 1935 |
| 2,133,548 | Lassiter | Oct. 18, 1938 |
| 2,160,385 | Kraemer et al. | May 30, 1939 |
| 2,302,322 | Howard | Nov. 17, 1942 |
| 2,430,799 | Aspinwall | Nov. 11, 1947 |
| 2,488,125 | Hungate | Nov. 15, 1949 |
| 2,555,702 | Railton | June 5, 1951 |
| 2,567,042 | Wemp | Sept. 4, 1951 |
| 2,599,214 | Wemp | June 3, 1952 |